Patented Feb. 26, 1946

2,395,472

UNITED STATES PATENT OFFICE 2,395,472

TANNING COMPOSITIONS AND THEIR MANUFACTURE

Herbert B. Fernald, Cleveland, and Ralph K. Iler, Cleveland Heights, Ohio, assignors to E. I. du Pont de Nemours & Company, Wilmington, Del., a corporation of Delaware No Drawing. Application February 25, 1942, Serial No. 432,256

1 Claim. (Cl. 8—94.19)

This invention relates to compositions adapted to be dissolved in acid to produce silicic acid solutions suitable, among other things, for use as tanning baths. The invention is more particularly directed to compositions comprising a hydrogen bonding donor compound and an acid-soluble, double silicate of an alkali metal and a metal selected from the group consisting of aluminum, chromium, iron, zinc, titanium, and zirconium, the composition dissolving in acid to form modified silicic acid sols useful for such things as tanning, insolubilizing protein, and strengthening paper. The invention is also directed to a precipitated sodium aluminum silicate and to processes for its manufacture.

Practices for tanning skins with silicic acid have recently been improved by the inclusion of a hydrogen bonding agent in the tannage. These newly-improved baths customarily contain a silicic acid sol, a hydrogen bonding agent, and aluminum sulfate, and tanners find considerable difficulty in accurately proportioning the materials needed at the place of use. Many tanners are poorly equipped and unable accurately to measure out the reactants and to carry out the procedure of preparing the rather complicated tanning solution. Most tanners prefer a composition which can be dissolved and made up ready for use by workmen comparatively unskilled in the manufacture of chemicals.

It is an object of this invention to provide prepared compositions which can be dissolved in an acidulous medium to produce tanning compositions comprising silicic acid sols and suitable aluminum compounds, or other metal compounds, together with other desired modifying agents. It is a further object to provide compositions comprising an acid-soluble, double silicate of an alkali metal and a metal selected from the group consisting of aluminum, chromium, iron, zinc, titanium, and zirconium together with modifying agents adapting the product to the uses for which it is intended. It is a further object to provide compositions comprising sodium aluminum silicate with modifying agents particularly adapting the product to its intended purposes. It is a still further object to provide a precipitated, acid-soluble sodium aluminum silicate and to provide simple and economical processes for its production. Further objects will become apparent hereinafter.

Compositions of this invention are generally characterized by containing an acid-soluble, double silicate together with a hydrogen bonding agent and with or without such other modifying agents as are desired to adapt the composition to its intended purpose. For instance, dissolving a sodium aluminum silicate in a dilute acid causes the formation of a silicic acid sol and an aluminum salt of the acid. If the sodium aluminum silicate is dissolved in the presence of a hydrogen bonding agent one immediately obtains a tanning solution. The tanning solution can therefore be prepared simply by dissolving the compositions of this invention in a dilute acid and workmen are called upon to effect no chemical control other than that on acidity with which they are already entirely familiar because of the frequent pH adjustments in normal tanning processes. Similarly, compositions may be made up with double silicates using instead of aluminum a metal such as chromium, iron, zinc, titanium, or zirconium and corresponding tanning solutions can be prepared simply by dissolving the double silicate in a suitable acid.

Double silicates used according to the present invention will ordinarily have an alkali metal as one cation and an amphoteric, tanning metal as a second cation. The alkali metal cation may be lithium, sodium, or potassium. The second cation should be selected from the group consisting of aluminum, chromium, iron, zinc, titanium, and zirconium since compounds of these metals are valuable modifying agents in silicic acid tanning solutions.

Any double silicate of the type described may be used which is acid-soluble. There may be used, for instance, any of the natural silicates occurring in nature. Suitable naturally occurring sodium aluminum silicates, for instance, are analcite, naturolite, and nethelite. Natural sodium aluminum silicates and other such silicates will frequently contain insoluble material and will frequently be made up of mixtures of silicates, but these are all suitable so long as they form silicic acid sols admixed with an aluminum salt or other suitable metal salt upon being dissolved in a dilute acid.

Instead of these naturally occurring silicates there may be used any of the similar compounds prepared commercially. Typical of these compounds are sodium aluminum silicates prepared, for instance, by reacting a silicate with an aluminum compound. Examples of such materials will be found in the Benson Patent 2,244,383 and in the Schorger Patent 1,949,360. Sodium aluminum silicates are also produced by heating kaolin with a sodium hydroxide solution. Other double silicates may be produced by analogous reactions.

While double silicates and particularly sodium aluminum silicates occurring in nature or prepared as are the synthetic zeolites may advantageously be used, the preferred practice of the present invention is to use a water-insoluble, acid-soluble, precipitated double silicate and particularly a precipitated sodium aluminum silicate which is made at a high pH by processes more particularly described hereinafter.

Aluminum silicate compositions of the present invention ought to have a mol ratio of $Al_2O_3:SiO_2$ of 1:2 to 1:5. For tanning it is preferred that the ratio be between 1:2 and 1:4. Natural sodium aluminum silicates selected or artificial materials prepared ought to have an $Al_2O_3:SiO_2$ ratio within the limits. It will be understood, however, that if a natural or prepared sodium aluminum silicate has a ratio different from that which is desired, for instance in a tanning composition, this can be adjusted at least to some extent by adding an aluminum compound such as alum to increase the $Al_2O_3$ content. In the case of prepared sodium aluminum silicate it will ordinarily be desirable to predetermine the ratio and mixtures may be made with natural materials to produce a product having substantially any desired ratio for tanning. Similarly with compositions using metals other than aluminum, the metal ought to be present in a ratio metal oxide:$SiO_2$ about as indicated for aluminum.

Tanning compositions according to the present invention include a hydrogen bonding donor compound. Hydrogen bonding is a concept advanced in recent years to explain certain abnormalities in the chemical and physical behavior of mixtures of compounds one of which contains hydrogen attached to a strongly negative radical and the other an atom capable of donating a pair of electrons to form a directional or co-ordination bond. Since the bond is formed by the donation of an electron pair from one atom, the donor to the other atom the bond is not of the type conceived as an ordinary valence bond but many of the properties of the mixture indicate that a type of chemical compound is formed. These mixtures, for instance, exhibit an abnormal vapor pressure lowering, that is abnormal deviation from Raoult's law. There is further observed abnormal heats of mixing and abnormal deviation in viscosity and freezing point lowering.

When silicic acid is mixed with an organic hydrogen bonding donor compound it exhibits characteristics unexplainable upon the basis of ordinary chemical reaction and unexpected from a consideration of the characteristics of the materials mixed. Apparently silicic acid has an acceptor hydrogen atom and forms some type of compound with a hydrogen bonding donor. Among the characteristics of these silicic acid-hydrogen bonding donor combinations is a decreased tendency to precipitate gelatin and an increase in the time required for the sol to be converted to the gel.

It will be understood that in advancing the theory of hydrogen bonding it is not intended to limit or restrict the present invention, the explanation being given only for purposes of illustration. Whatever the reason the type of compounds known to be organic hydrogen bonding donors profoundly modify silicic acid sols and may desirably be included in the compositions of the present invention.

It will be seen that hydrogen bonding donor compounds are of the type of materials which might be designated as weak organic bases. According to this theory the materials involved act as bases with silicic acid which is quite a strong acid. These bases are of such weakness that they will not raise the pH of a silicic acid solution above 7. According to this theory one may therefore describe the agents added to silicic acid sols according to the present invention as water-soluble, organic bases which will not raise the pH of silicic acid above 7. It is again observed that while the terminology of either the "hydrogen bonding" theory or the "weak base" theory may advantageously be used in describing the present invention to those skilled in the art in commonly understood language applicants do not consider the adoption of either theory as bearing upon the invention save as it gives a convenient system of terminology.

While any hydrogen bonding donor compound (or weak base) may be used with silicic acid according to the present invention it will generally be found desirable to use any water-soluble hydrogen bonding donor compound selected from the group consisting of ethers, amides, alcohols, ketones, and esters of phosphoric acid.

Hydrogen bonding donor compounds used in the compositions of this invention should be water-soluble at least to the slight extent required to permit formation of a coordination complex with silicic acid. In addition to being water-soluble a hydrogen bonding donor should not contain groups which will react with silicic acid in aqueous acidic media to give compounds of the conventional sort when such reaction would interfere with hydrogen bonding. The donor preferably should not react with silicic acid to give a precipitate.

As has been indicated, the water-soluble, organic hydrogen bonding donor compounds used according to this invention are preferably selected from the group consisting of ethers, amides, alcohols, ketones, and esters of phosphoric acid. It is preferred that the ethers have an oxygen or nitrogen atom in addition to that in the ether linkage and specifically it is desirable that the ether contain in addition to the ether group a second ether group, a hydroxy group, an amide group, or an ester group. In the ethers the two carbon atoms attached to the oxygen atom of the ether linkage should not be attached to each other. Amides for use with silicic acid sols according to the present invention are preferably N-substituted. Alcohols for use as donors ought to contain more than two carbon atoms. Alcohols are among the weakest of the hydrogen bonding agents but may find value in some instances. Ketones are not quite as weak as alcohols and any water-soluble ketones may be used as above discussed. Esters of phosphoric acid are quite effective hydrogen bonding agents and may frequently be included in compositions of this invention to advantage.

Ethers are among the preferred hydrogen bonding donor compounds for inclusion in compositions according to the present invention. In addition to containing an ether group these donors may advantageously contain an additional ether group, a hydroxy group, an amide group, or an ester group. The presence of these groups appears very beneficial. A number of such groups may be present and there may be used, for instance, polyethers which contain hydroxyl groups and ester groups. As examples of ethers the following are listed:

Nonaethylene glycol
Dimethyl ether of tetraethylene glycol
Dimethyl ether of diethylene glycol
Hexaethylene glycol
Butyl ether of diethylene glycol
Ethyl ether of diethylene glycol acetate
Methyl ether of diethylene glycol acetate
Tetraethylene glycol
Monoethyl ether of diethylene glycol
Triethylene glycol
Monoethyl ether of ethylene glycol
Monomethyl ether of ethylene glycol
Diethylene glycol
N,N'-Bis(beta-methoxyethyl) adipamide
N,N'-Bis(methoxymethyl) urea
Polyethylene glycol adipate
Diethyl ether of diethylene glycol
Dioxane
Dioxolane
Diethyl ether of ethylene glycol
Dimethyl ether of ethylene glycol
Triethylene glycol dipropionate
Glycerol formal
Ethylene glycol acetal
Sorbitol triacetal
N,N-Dimethylmethoxyacetamide
N-Acetylmorpholine
N,N'-Adipyldimorpholine
Dimorpholide urea
Polyethylene oxide
Monomethyl ether of ethylene glycol—ethylene oxide reaction product
Ethylene glycol—ethylene oxide reaction product
Glycerol—ethylene oxide reaction product
Ethanolformamide — ethylene oxide reaction product Amides are among the preferred hydrogen bonding donors for use in compositions according to this invention. Whereas oxygen is the donor atom in ethers the nitrogen of amides probably acts as the donor atoms. Among the most effective compounds of this group are the N-substituted amides and the di-substituted compounds are preferred. It will be seen that some of the compounds in the above list of ethers are amides as well and could have been shown below as illustrative of the use of amides.

Examples of amides are listed below, ureas and other amides being listed separately:

Ureas:
    Tetramethylurea
    Tetraethylurea
    Urea
    Thiourea
    N,N'-Diethyl-N,N'-diethanolurea Amides:
    N,N,N',N'-Tetramethyladipamide
    N,N-Dimethylacetamide
    N,N,N',N'-Tetramethylsuccinamide
    N,N,N',N'-Tetraethylsuccinamide
    N,N-Diethylacetamide
    N,N,N',N'-Tetraethyloxamide
    N,N-Diethylformamide
    N,N-Diethylpropionamide
    N,N-Dimethylformamide
    N,N,N',N'-Tetraethyloxamide
    N,N-Diethylglycolamide
    N-Ethyl-N-ethanolformamide
    N-Ethyl-N-ethanolglycolamide
    N-(2,3-Dihydroxypropyl) methoxyacetamide
    N-Butyl-N-Beta-hydroxyethyllactamide
    N-Ethanolethanesulfonamide
    N-Isobutylacetamide
    N,N'-Diethanoloxamide
    N,N'-Diethanolsuccinamide
    N-Formylhexamethylenimine
    Diethylcyanamide
    Acetamide
    Succinamide
    Formamide Examples of Ketones may be given as follows:

Ketones:
    Acetonylacetone
    Acetone
    Formacetoethyl
    Methyl acetoacetate
    Diacetone alcohol Examples of Alcohols may be given as follows:

Alcohols:
    Diacetone alcohol
    2-Methyl-2,4-pentanediol
    Isopropanol
    Pinacol
    Hexamethylene glycol
    Pentaglycol
    Tert-Butyl alcohol
    Tetrahydroxy octane
    1,1,1-Trimethylolethane
    Propanediol Esters of phosphoric acid:
    Tributyl phosphate
    Triethyl phosphate
    Tri-isopropyl phosphate
    Tri-isoamyl phosphate
    Hexyl phosphate
    Tri(butyl ether of diethylene glycol) phosphate The amount of hydrogen bonder to use in a particular composition varies considerably with the results desired and with the particular double silicate and the particular tanning procedure to be followed. The amount of donor should of course not be so great as to slow the tanning unduly and yet it should be sufficient to prevent too rapid a tanning. The precise amount of a particular agent to use in a particular instance can best be determined by making up a few sample compositions and then trying tanning baths made with them. In general it may be indicated that there should be used an amount of donor such that when a tanning solution has been made up with the composition the donor will be equivalent to from about 0.1 per cent to about 10 per cent of the weight of the tanning solution.

Tanning compositions of the invention may advantageously include masking agents for the alumina or other metal tanning component. As masking agents one may use, for instance, lactates, acetates, propionates, tartrates, glycollate, citrate, oxalate, adipate, succinate, or glutarates of sodium, potassium, ammonium, or an alkaline earth metal the cation being unimportant provided it does not form an insoluble inorganic salt with tanning bath constituents and provided it does not interfere with the tanning process. Small amounts of these masking agents will of course be used in accordance with the customary practice since too much of the masking agent will too greatly retard tanning. In general from about 5 per cent to 100 per cent of the weight of alumina, or other metal as oxide, may be used.

Compositions according to the present invention may contain still other modifying agents and there may be included, for instance, other tanning agents and tanning assistants. The compositions of the present invention may advantageously be used for insolubilizing protein, for strengthening paper, and for numerous other purposes and suitable modifying agents may advantageously be added depending upon the specific use for which the compositions are intended.

In making up tanning solutions with the compositions of the present invention it is only necessary to dissolve the composition in a dilute acid. Ordinarily dilute sulfuric acid sufficient to bring the pH to a proper value for tanning will be used. Alternatively there may be employed such acidic materials as sulfamic acid, hydrochloric acid, nitric acid, thionic acids, acetic acid, lactic acid, and other similar inorganic and organic acids. Acidulous salts may similarly be used and there may be employed, for instance, sodium bisulfate, monosodium phosphate, acid tartrates, zinc chloride, titanium sulfate, aluminum sulfate, and chromium sulfate. The amount of acid or acidic material will ordinarily be such as to result in a pH of about 1 to 5.

It will ordinarily be found desirable to produce a final pH of about 1.5 to 3.5. Still more specifically, it will be preferable to reduce the pH to about 2 to 3. It will be understood that while any acidulous material may be used to increase the acidity of silicate solutions to produce silica sols, some acidulous materials do not themselves have a low enough pH to produce the final acidity desired. In this event such an acidulous material may be used in combination with a more acidulous material, and as will be evident mixtures of two or more acidulous materials may be used as seems desirable.

Acids may be included in compositions of the present invention by mixing the compositions with such dry acids and acidulous materials as sulfamic acid and sodium acid sulfate. To minimize the reaction between the solid acid and the double silicate one or both the ingredients can be coated with an inert prior to mixing. If the compositions are to be stored any length of time there is unfortunately a tendency to premature reaction and it will ordinarily be found desirable under these circumstances to offer the components separately or else simply as indicated above to let the tanner add the composition to a dilute acid solution.

The concentration of tanning agents made up using compositions of the present invention may be considerably varied as in prior processes using similar sols. The concentration will depend specifically upon numerous factors in the tanning process itself, but it will rarely be found desirable to have an $SiO_2$ content greatly in excess of about 2 per cent.

The tanning compositions of this invention may be used to make up tanning baths for the treatment of any type of skin adapted to be converted into leather or fur. It is to be observed that the term "skin" is used generically to include heavy skins such as cowhide, lighter skins such as goatskin and calfskin, and also skins of fur-bearing animals. It will naturally be necessary to adapt the processes to the type of skin to be treated. For instance, goatskin may be more rapidly tanned than calfskin, but those skilled in the art are well aware of such factors and may readily adapt the compositions of this invention to the specific needs of particular specialized problems.

Skins to be tanned employing compositions of this invention may be prepared in any of the manners customary to the art. They may suitably be unhaired, limed, delimed, and bated and pickled. The skins may if desired be depickled. They may also be given a salt liquor treatment to soften them and to put them in a more uniform condition as is the practice in prior art tanning processes.

While skins prepared in any manner may be treated using tanning solutions made up with compositions of this invention, the pH of the skins is important. As will be observed below, the tanning is effected at certain conditions of acidity and the skins may tend to change these conditions. The tanning solution may suitably be controlled to compensate for variance of the pH of the skins from that of the tanning solution. It may sometimes be found advantageous to adapt the processes for preparing the skins so that a skin prepared for tanning is approximately at the pH of the tanning solution.

Too rapid reaction of the tanning agent with the skins in the first stages of the process should be avoided in order to prevent surface hardening of the skin. The amount of hydrogen bonding donor used should, as indicated above, be such as to assist in preventing too rapid a tanning and the initial pH of the solution should not be too high. The initial pH of the solution will ordinarily be from about 1.5 to 3.0. More specifically, it will be found preferable to use a pH of about 2.5. If the initial pH is much above 3.5 the tanning will proceed too rapidly in the initial stages though it will be understood that the pH to be selected in any particular instance will depend upon the specific conditions of the tannage. If too low a pH is used combination of silica with the skin is too slow and, additionally, excessive acidity may deleteriously affect the skin.

After satisfactory penetration has been obtained the pH of the solution is raised by the addition of any suitable alkali. Raising the pH accelerates the tanning action. The pH should at this point be raised to about 3.5 to 4.5. Sodium carbonate or other alkali metal or ammonium hydroxides or carbonates or organic bases such as ethanolamines may be used to raise the pH.

The considerations as to the type of apparatus to use, the time to be allowed for tanning, the temperatures of tanning, and the amounts of tanning agent are substantially those known to the art in connection with prior art tanning processes. The time allowed for tanning must be sufficient to permit complete penetration of the tanning agent, and the pH should not be raised too rapidly or there may be puckering and apparent over-tannage of the grain surface. The tanning can best be effected at room temperature, say 20° to 30° C. The exact amount of the tanning solution to use can best be determined by a few simple tests under the specific conditions of the process selected and with the specific skin to be treated. In general, enough of the tanning agent must be used to effect the tanning desired but unduly large amounts should not be used as they will not be taken up by the leather in a reasonable period of time and they may cause overtannage.

While compositions of the invention may be made as described with various natural and manufactured double silicates, it is preferred to use a precipitated sodium aluminum silicate, or other double silicate, the manufacture of which will now be described. The precipitated sodium aluminum silicates are acid-soluble, amorphous, soft, chalky, white, and opaque. The ratio $Al_2O_3:SiO_2$ may vary from about 1:2 to 1:5 though the preferred product has a ratio between about 1:3 to 1:4. The precipitated sodium aluminum silicates are made at a high pH and contain less than 1.5 mols of Na₂O per mol of Al₂O₃.

In the preparation of the precipitated silicates of the invention it will ordinarily be found desirable to use sodium silicate for the reaction, but it will be understood that any silicate more soluble than its products of reaction with the aluminum compound, or other metal compound, may be used. There may be used, for instance, potassium or lithium silicates. The SiO₂/Na₂O ratio ought not be substantially greater than 2. It is preferred to use sodium metasilicate but if a silicate with a higher SiO₂/Na₂O ratio is used an alkali will need to be added. In any event the total alkali in the reaction should be sufficient to maintain a pH of 9 or more.

If an alkali is required then any alkali may be used which will bring the pH of the reaction to at least 9, though of course the alkali should not be one which will react with the silicate or aluminum compound to form insoluble by-products. As examples of suitable alkalies there may be mentioned sodium hydroxide, potassium hydroxide, calcium oxide, barium oxide, or organic bases such as tetraethanolammonium hydroxide.

Any aluminum compound may be used which is more soluble than the product of reaction with the silicate. There may be used, for instance, aluminum sulfate, aluminum hydroxide, sodium aluminate, aluminum nitrate, or aluminum chloride. When an aluminum compound such as sodium aluminate is used it will of course be easier to maintain a pH of 9 or more during the reaction.

It will be found a comparatively simple matter to adjust the composition of the precipitated sodium aluminum silicate since almost all, say over 90 per cent, of the silica and alumina used in the reaction will be found in the product. The proportions of reactants should be so selected that the Al₂O₃:SiO₂ ratio will fall within the limits from about 1:2 to 1:5. Preferably the product will have an Al₂O₃:SiO₂ ratio of from about 1:3 to 1:4. Products within these ratios will be found soluble in a 0.1 normal hydrochloric acid solution.

The alkalinity of the product should be kept down, and the product should contain not more than 1.5 mols of Na₂O per mole of Al₂O₃. The use of large excesses of alkali in the reaction should therefore be avoided and the product should be carefully washed.

To effect reaction the soluble silicate and the soluble aluminum compounds are each first put in solution and then these solutions are brought together. The solution of silicate may ordinarily contain from about 5 to 15 per cent of solids and the solution of the aluminum compound may similarly contain about 5 to 15 per cent solids. The final mixture should not contain much in excess of about 20 to 25 per cent solids by weight.

It will be understood that in effecting reaction it will ordinarily be found desirable to add the aluminum compound solution to the silicate solution. In this way one may most easily avoid the presence of local concentrations of aluminum compound having a pH below 9. It will be found possible, however, to run the two solutions simultaneously into a mixer in proper ratio, and in general any method of mixing may be effected so long as low pH is avoided. As has been indicated, a pH substantially below 9 should not be permitted for a substantial period of time during the reaction, but if the reaction is conducted at a pH of 9 or above then the pH may be reduced towards the end of the reaction period to as low as 7 or 8 without markedly injuring the product. It may frequently be found desirable after the reaction is substantially concluded, therefore, to reduce the pH so that the product will be substantially neutral.

After the reaction is concluded the precipitate may be filtered and washed. The product can be made more easily filterable by effecting the reaction at superatmospheric pressures or at elevated temperatures or both. Ordinarily, however, no substantial benefit is derived from the use of either heat or pressure.

While the precipitated sodium aluminum silicate of this invention is particularly well adapted for use in tanning compositions in conjunction with a hydrogen bonding agent it will be apparent that the product may find numerous other uses. The product is soft, chalky, pulverulent, and extremely reactive. The product is suitable for use as a filler in rubber and plastics and may be used as a substitute for or in conjunction with clay as a paper filler and in compositions for paper coating. The product may also be used as a base exchange medium, as a carrier for pesticides, as an ingredient in cement, as a catalyst or catalyst carrier, and as a pigment base for instance by adsorbing dyes on the sodium aluminum silicate.

While the above discussion illustrating the preparation of a precipitated sodium aluminum silicate has been directed to a particular double silicate, it will be understood that the principles shown are applicable to the formation of various double silicates using any alkali metal and any metal selected from the group consisting of aluminum, chromium iron, zinc, titanium, and zirconium. For the preparation of other such acid-soluble double silicates the reaction conditions will be similar and the proportions and ratios of reactants will similarly be selected to produce compounds suitable for use in tanning or various of the other uses as outlined above.

In order that the invention may be better understood reference should be had to the following illustrative examples:

*Example I*

A precipitated sodium aluminum silicate was prepared according to a process of the invention as follows:

Twenty-four and nine-tenths parts by weight of commercial iron-free aluminum sulfate (containing 16 per cent Al₂O₃) dissolved in 132 parts by weight of water was slowly added with vigorous agitation to a solution containing 31.5 parts by weight of a sodium silicate solution containing Na₂O=9.1 per cent and SiO₂=29.7 per cent and 10.0 parts by weight of flake caustic (equivalent to 6.85 parts of Na₂O) dissolved in 175 parts by weight of water. The SiO₂:Na₂O ratio by weight of the final silicate solution used was 0.96. The additional sodium hydroxide was used therefore to adjust the alkalinity to that required to maintain a pH of about 9 during the reaction.

The aluminum sulfate was added directly into the vortex of a stirrer so as to have rapid and efficient mixing.

After all the aluminum sulfate had been added, the reaction slurry was stirred for 15 minutes to insure complete reaction. This slurry contained 18.5 parts of sodium aluminum silicate and 16 parts of sodium sulfate in approximately 330 parts by weight of water. Throughout the reaction the pH was above 9 and at the end of the reaction was about 10.5.

The product was filtered out, washed to remove the sodium sulfate and then dried for 15 hours at 110–115° C. 18.0 parts by weight of the dry product was obtained containing 43.20 per cent $SiO_2$, 22.41 per cent $Al_2O_3$, 17.24 per cent $Na_2O$ and 17.70 per cent ignition loss. The yield was 97.2 per cent of the theoretical. This particular product had a ratio of $SiO_2$ to $Al_2O_3$ of 3.28 to 1, and a ratio of $Na_2O$ to $Al_2O_3$ of 1.26:1.

From the composition of the material it was found that all the aluminum and 87–88 per cent of the silicate used in the reaction appear in the final product.

The product was amorphous, soft, chalky, white, and opaque and it was found well adapted for the various uses indicated above. It was particularly excellent when used in tanning compositions of the invention. Examples of tanning compositions using precipitated aluminum silicates are given hereinafter.

*Example II*

Since the ratio between $Na_2O$ and $SiO_2$ is 1:1 in sodium metasilicate, it can be used instead of the sodium silicate and free alkali used in Example I in the production of precipitated sodium aluminum silicate. 44.0 parts by weight of commercial iron-free aluminum sulfate (16.0 per cent $Al_2O_3$), dissolved in 180 parts by weight of $H_2O$, was reacted with 83.16 parts by weight of sodium metasilicate (28.62 per cent $SiO_2$) dissolved in 400 parts by weight of water. This reaction was carried out in the same way as outlined in Example I. The ratio of $SiO_2$ to $Al_2O_3=5.74$ in the reaction mixture. At no time during the reaction did the pH go substantially below about 9.

The precipitate was filtered out, washed and dried. The material thus obtained was white, chalky, amorphous, easily pulverized, and very soluble in dilute acids. Analysis showed it to contain 19.03 per cent $Al_2O_3$, 15.45 per cent $Na_2O$, 48.90 per cent $SiO_2$ and 15.25 per cent loss on ignition. $SiO_2:Al_2O_3=4.35:1$ and $$Na_2O:Al_2O_3=1.33:1$$

in the final product.

*Example III*

The acid-soluble, precipitated sodium aluminum silicate of the invention can conveniently be prepared using sodium aluminate as the source of aluminum. Products were prepared by procedures similar to those of the previous examples but reacting a solution of sodium aluminate with sodium metasilicate solution. The sodium aluminate was prepared by reacting aluminum sulfate with caustic soda and the reaction product thus prepared was then reacted with sodium metasilicate solution. During the reaction with sodium metasilicate the pH did not drop below about 11. The products produced were white, porous, and easily pulverized. When the reactants had an $SiO_2:Al_2O_3$ ratio of 4:1 the product had a ratio of 2.78:1. When the reactants had a ratio of 6:1 the product had a ratio of 3.01:1. Similar products were made containing smaller amounts of $SiO_2$ but these were less readily soluble. Products made with sodium aluminate and sodium metasilicate as in this example had $Na_2O:Al_2O_3$ ratios of about 1.0 to 1.4.

*Example IV*

Sixteen and twenty-five hundredths parts by weight of commercial iron-free aluminum sulfate (16.0 per cent $Al_2O_3$) was dissolved in 80.0 parts by weight of water. Concentrated caustic solution was added to this solution until the precipitate which first formed redissolved.

This solution is then added with violent agitation to a solution containing 10.48 parts by weight of sodium metasilicate, 75 parts by weight of water. The $SiO_2:Al_2O_3$ was 2:1 in this reaction mixture.

The precipitate which formed was filtered, washed and dried. A white, porous, easily pulverized material was obtained. This material was rather difficultly soluble in acid solution.

By analysis this material contained 38.85 per cent $SiO_2$, 29.78 per cent $Al_2O_3$, 18.29 per cent $Na_2O$, and 12.68 per cent loss on ignition. $SiO_2$ to $Al_2O_3$ ratio in the product=2.21 to 1. $Na_2O$ to $Al_2O_3=1.01$ to 1. The pH throughout the reaction was maintained above 11.

*Example V*

Twenty and five-tenths parts by weight of sodium aluminate ($Na_2Al_2O_4$) dissolved in 240 parts by weight of water was added with stirring to a solution containing 101 parts by weight of a sodium silicate solution ($Na_2O=9.1$ per cent, $SiO_2=29.7$ per cent) and 22.2 parts by weight of sodium hydroxide dissolved in 1120 parts by weight of water. As in the previous examples, a white, flocculent precipitate formed and was filtered out, washed and dried. The pH during the reaction did not fall below about 11.

The product was identical in appearance to those described in the previous examples and was easily acid soluble.

*Example VI*

A tanning composition of the present invention was made up using precipitated sodium aluminum silicate prepared as in Example I. 27.5 parts by weight of the precipitated aluminum silicate was mixed with 11.2 parts by weight of urea. 35.5 parts by weight of sulfamic acid was dissolved in 200 parts by weight of water and the prepared composition was then readily dissolved in the water. 100 parts by weight of drained goatskin which had been prepared in the usual way by unhairing, deliming, and pickling were put into this solution in a tanning drum and thoroughly mixed. The skins were agitated for one hour and then the addition of a 10 per cent solution of sodium acetate was begun. By repeated additions of sodium acetate over a course of 7.5 hours, the pH of the solution was brought to a final value of pH 4.0. The solution was then drained from the drum. The tanned skins were piled down over night. The next morning they were neutralized to a pH of 5.5 with 10 per cent sodium bicarbonate solution during 1¼ hours with further agitation. Subsequently the hides were washed with water and fatliquored with a sulfonated oil-neat's-foot oil mixture. The tanned skins were soft, pliable, white, and had a shrink temperature of about 185 to 190° F.

A similar composition was made up in which the dry sulfamic acid was admixed with the precipitated aluminum silicate and urea. This mixture was fairly stable and for use it needed only to be added to a correct amount of water.

*Example VII*

Fifty parts of pulverized precipitated sodium aluminum silicate prepared according to Example I were intimately mixed with 5.8 parts of nonaethylene glycol. The latter is a liquid material, but due to the extreme porosity and absorbent nature of the precipitated sodium aluminum silicate, the liquid nonaethylene glycol is completely absorbed, the mixture appearing to be a dry powder. The tanning composition thus prepared can be dissolved in an acid solution for use in tanning as in Example VI.

Example VIII

Fifty parts of precipitated sodium aluminum silicate are mixed with 21.8 parts of tributyl phosphate. As in the previous example, although the tributyl phosphate is a liquid, the resulting mixture is an apparently dry light powder. The tanning composition may be used as in Example VI by dissolving it in a dilute acid.

Example IX

Fifty parts by weight of sodium aluminum silicate prepared as in Example I were mixed with 25 parts of powdered urea. To this mixture was also added 25 parts by weight of sodium acetate which had previously been pulverized to pass a 100 mesh screen. The mixture was agitated until the ingredients were thoroughly intermingled. Upon dissolving this composition in dilute sulfuric acid a tanning solution is produced containing silicic acid, a hydrogen bonding agent, aluminum sulfate and a masking agent.

Example X

One hundred one and five-tenths parts of granular sodium acid sulfate in the form of shot of such a size that it will pass thru a screen having 6 meshes to the linear inch but will not pass thru a screen having 30 meshes to the linear inch, are mixed with 41.1 parts of sodium aluminum silicate and 17.7 parts of tributyl phosphate. When this mixture is added to about 800 parts of water and thoroughly stirred for 15 minutes, there is obtained a solution of silicic acid having tributyl phosphate emulsified in it. This solution functions admirably in tanning hides according to the procedure previously described. A composition as shown in this example is none too stable and it should be used within a fairly short time.

Example XI

One hundred three parts of shotted sodium acid sulfate of the type used in the previous example are mixed with 41.1 parts of precipitated sodium aluminum silicate, 20.0 parts of urea, and 33.0 parts of anhydrous sodium acetate. When this mechanical mixture is dissolved in about 800 parts of water, a solution is obtained suitable for tanning.

In order to prevent segregation of the various ingredients from these mechanical mixtures, it is advantageous to mix them thoroughly and then compress the mixture into pellets or small briquettes which readily disintegrate upon being agitated with water.

Although the particle size of the ingredients is not important if the mixture is to be used within a few days, it will be found that if all the ingredients are finally pulverized prior to mixing, some interaction between the sodium acid sulfate and the sodium aluminum silicate will take place. In order to minimize this effect, I prefer to use relatively coarse sodium acid sulfate in the shotted form, since in this state it is much less reactive than when pulverized to 100 mesh.

In order to minimize the reaction between the solid acid and the sodium aluminum silicate, one or both ingredients can be coated with an inert substance prior to mixing, e. g., the sodium bisulfate pellets may be stirred wtih 2 per cent by weight of calcium stearate which coats the pellets with a thin white adherent film, before mixing with the sodium aluminum silicate.

Example XII

Fifty parts of laumontite, a naturally occurring calcium sodium aluminum silicate, is ground to pass a screen having 300 meshes to the linear inch and is mixed with 20 parts of powdered urea which had been previously pulverized to pass the 100 mesh screen. The mixing is continued until the ingredients are thoroughly intermingled. The tanning composition may be used as in Example VI, by dissolving it in dilute sulfamic acid solution, using sufficient acid to maintain the mixture at a pH of about 2 until substantially all the acid-soluble material in the mineral is dissolved. Tanning with this solution may then be carried out as in Example VI.

Example XIII

Fifty parts of sodium aluminum silicate of the gel-type similar to that described in the Benson Patent 2,244,383 was ground so as to pass a screen showing 300 meshes to the linear inch and was thoroughly mixed with 11.6 parts by weight of carbitol acetate. This tanning composition may be dissolved in sufficient dilute acid solution so that the pH is maintained at around 2 until all the mixture is dissolved. The gel-like sodium aluminum silicate dissolves at a much slower rate than the precipitated material. The tanning procedure is carried out as described in Example VI.

Tanning compositions similar to those of the example may be made up using hydrogen bonding agents and double silicates of chromium, iron, zinc, titanium, and zirconium.

While we have shown certain illustrative processes and compositions it will be understood that the invention is not to be limited thereby, and while the illustrative examples show the use of the compositions for tanning skins it will be understood that the compositions may be used for insolubilizing protein, strengthening paper, and for any other use.

We claim:

A solid composition, adapted to be dissolved in acid to produce a modified silicic acid sol, comprising an organic hydrogen bonding donor compound and a precipitated sodium aluminum silicate having an $Al_2O_3:SiO_2$ ratio of from about 1.2 to 1.5 and an $Na_2O/Al_2O_3$ ratio no greater than about 1.5.

HERBERT B. FERNALD.
RALPH K. ILER.